April 19, 1927. Re. 16,596

H. COLOMB

MANUFACTURING PROCESS OF MAKING BLANKS FOR WATCH MOVEMENTS PROVIDED WITH JEWEL INSETTING OR PLUG HOLES

Original Filed Oct. 15, 1922

INVENTOR

Henri Colomb

Reissued Apr. 19, 1927. Re. 16,596

UNITED STATES PATENT OFFICE.

HENRI COLOMB, OF TAVANNES, SWITZERLAND.

MANUFACTURING PROCESS OF MAKING BLANKS FOR WATCH MOVEMENTS PROVIDED WITH JEWEL-INSETTING OR PLUG HOLES.

Original No. 1,571,756, dated February 2, 1926, Serial No. 592,642, filed October 5, 1922. Application for reissue filed January 6, 1927. Serial No. 159,467.

This invention relates primarily to improvements in blanks for watch movements.

According to the manufacturing process hitherto adopted for turning out watch movement plates and bridges, the movement blank has usually been completed by the operations connected with uprighting and jewel-setting, which operations require skilled labour and more or less complicated machinery, as well as first grade tools, the gauging and maintenance whereof are often costly and, if said tools are not repaired when they should be, the result is that complete series of watch pieces are made with persistent defects or imperfections which may be detected only when the movements are "assembled" or "finished up", all of which cause serious inconveniences, both to manufacturers and workmen.

According to the usual method of manufacturing movement blanks the accuracy of the working holes which serve as guiding marks and aids for mounting and rotating the plates during machining gradually decreases as the blanks are completed, and for the later operations connected with the "uprighting" and jewel-setting the very basis required for obtaining thoroughly interchangeable parts is wanting. Further, the footholes in the plate and bridge are generally produced according to prick-punching only, which method requires, in all cases, an individual manipulation of each movement, and the plates, and also the bridges to be fitted therein, then require to be numbered in order to secure, after "uprighting" or jewel-setting, a co-axial position of the holes wherein the staff and other pivoted members are to revolve.

In recent years certain manufacturers have endeavored to do away with numbering and to alter the uprighting system by stamping out by means of a die punch the footholes in the plate together with the working holes used therewith as guides for the later operations. The foot-holes in bridges being thus accurately formed, this method allows of uprighting the bridges on special working plates, independently of the movement plates. But jewel-setting in the bridges as well as uprighting and jewel-setting in the plates are performed by machinery, or by tools similar to those employed when the movement blank is made according to the method hereinbefore described.

The principal object of the present invention is to avoid the necessity for "uprighting" the plates and bridges, and to do away with the method of jewel-setting in current use, together with all machines and working parts required for such operations. A further object of the invention is to secure interchangeability of parts and thus dispense with the necessity for numbering the pieces. A still further object of the invention is to provide for quick and accurate testing of the plates and bridges, at any time, or at any stage of the machining thereof, by means of suitable gauges.

The manufacturing process according to the present invention relates to blanks for watch movements fitted with jewel insettings or plugs within which the staffs or spindles revolve, and is characterized by the process of accurately locating the relative positions of the jewel in-setting or plug holes and of the foot-holes, when the blanks are finished or nearly so, and by the simultaneous die rectification of the corresponding borings. It is to be understood that other borings and adjustments, eventually required in connection with fitting other parts of the movement, may also be rectified at the same time; so as to avoid any further "uprighting".

This rectification, as regards movement plates, may be performed in connection with the usual working holes or in connection with two or more additional working holes, the latter being rectified on the basis of the former, or vice versa, at the right time. Said additional working holes may serve later for a definite object or purpose, they may for example be used to locate pillars, headpins, jewel in-settings or plugs and the like.

For turning out the bridges, a similar process is employed; the jewel in-setting or plug hole or holes and the foot-holes may be rectified at the same time, or, on the other hand, the screw holes are formed when cutting out the jewel-setting or plug hole or holes, and then, after subsequent rectification, are themselves used as working holes when the jewel in-setting hole or holes and the foot-holes in the bridge are rectified with a proper die. Should the number of holes provided, for example, in a bridge, be inadequate to allow of two, at least, of these holes being taken as guiding-marks, one of said holes may be taken in combination with a portion of the outside periphery of the bridge, or the outside periphery of said bridge may alone be used for such purpose.

When on the one hand the position of the foot-holes in bridges relatively to the axis of the jewel in-setting hole or holes therein has been exactly located, through an accurate rectification of all these parts, and on the other hand, the corresponding holes in the plate have also been rectified in a similar manner, thoroughly interchangeable pieces will be obtained. Later on, the holes for plugs or jewel in-settings will receive their corresponding pieces (centrally bored plug or bushed jewels), the periphery whereof has been exactly rectified and centered according to the pivot bearings therein. This latter rectification will be performed preferably by means of a press according to the process of my Swiss Patent No. 95,294 and my U. S. Patents No. 1,528,872, dated March 10, 1925, and No. 1,523,169, dated January 13, 1925.

It will be readily understood that with such jewel in-settings or plugs located in conformity with the hereinbefore described method, the advantage will accrue that not only the plates and bridges are interchangeable, but also the wheel staffs or spindles will be maintained straight, while the distances between centers will remain fixed throughout a series. The latter advantage is very important, since it allows of using accurate and interchangeable parts, thus helping both factory operator and repairer. Operations connected with assembling and finishing-up are thus greatly simplified by this invention since they may be performed in shorter time and by less skilled hands, while improved results are also obtained.

In particular the necessity for finishing up, an operation which hitherto has always required specialized workmen, will be greatly reduced if not entirely eliminated especially when the elements are manufactured as they should be, viz, to standard measurements.

It is further pointed out that plugs and jewel in-settings, manufactured for use according to the present invention are interchangeable, since their diameters are accurate and the holes in plates and bridges, within which they are located, are easily rectified to a maximum clearance of a quarter of one hundredth of a millimeter. The difference in diameter between the jewel insetting or plug and its housing is such that should it be necessary, for any reason, to remove or change the plug in course of manufacture or when repairing the movement, this operation may be easily performed without special tools.

The holes for in-settings or plugs may either be previously drilled or cut out.

I have illustrated in the accompanying sheet of drawing some of the tools and parts used in carrying out my improved process. In these drawings.

Figure 1:
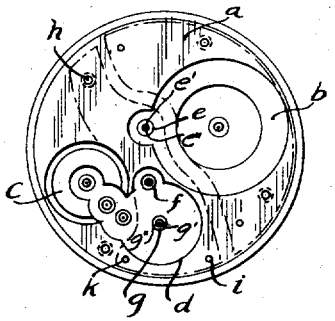
Fig. 1 is a face view of a plate with the bridges shown in broken lines.
Figure 2:
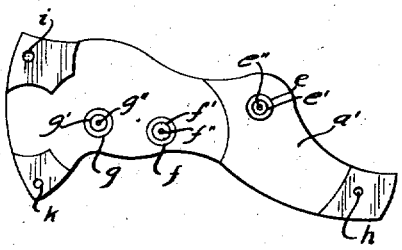
Fig. 2 shows the under face of a bridge, on an enlarged scale.
Figure 3:
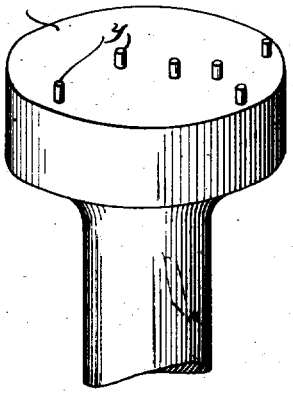
Fig. 3 is a perspective view of a rectifying or finishing punch for the group of holes in the bridge shown in Fig. 2.
Figure 4:
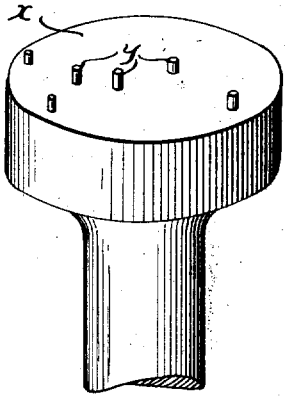
Fig. 4 is a similar view of the rectifying or finishing punch for the corresponding holes in the plate shown in Fig. 1.

Throughout the drawings like reference characters indicate like parts. *a* is the plate (the foundation or bed-plate for the little machine which constitutes the finished watch movement). *b*, *c* and *d* are cavities cut in the faces or interior of the plate in which certain of the larger moving parts of the movement, such as gears, spring barrel, escapement wheel, etc. are to be nested. *e*, *f* and *g* represent two sets of corresponding holes or recesses in which are set the plugs or bushed jewels *e'*, *f'* and *g'*, which latter have axial perforations or recesses *e''*, *f''* and *g''*, which will serve as journal bearings for shafts carrying gear wheels and pinions and other moving parts. One set of these holes and parts are shown in the plate (Fig. 1) and a corresponding set in the bridge (Fig. 2), so that when the bridge *a'* is turned over from the position shown in Fig. 2 and fastened to the plate *a*, its gear wheel shafts and other shafts may be journaled between said plate and bridge. *h*, *i* and *k* are holes in the plate and in the bridge for receiving the pins or feet by which the correct position of bridge *a'* (Fig. 2) on the plate *a* is assured. The multiple punches for finishing and rectifying the holes *e*, *f*, *g*, *h*, *i* and *k* are shown in Figs. 3 and 4. Each is formed of a matrix *x* in which a plurality of hardened pins *y* are accurately set.

In operating according to my invention the plate *a* first has the large cavities or "sinks" such as *b*, *c* and *d* and the smaller recesses such as *e*, *f*, *g*, *h*, *i* and *k* turned, bored or punched out. The latter are thus roughed out to a diameter slightly less than that of the foot pin, plug or jewel bushing which each is to receive. These borings or punchings are located in plate or bridge as exactly as possible and made as nearly parallel one to another as possible, but, from the nature of this preliminary, relatively rough work, slight inaccuracies may occur. The warping of the plate resulting from this heavy working and from the removal of considerable masses of the material usually increases these inaccuracies, but after the plate has settled into its final shape all the holes, *e*, *f*, *g*, *h*, *i*, *k*, etc. are trued up or rectified by the multiple punch shown in Fig. 4, the pins *y* of which are each a few hundredths of a millimeter larger in diameter than are the holes in plate *a* into which they are forced. In doing this each pin of the punch has to remove only a very thin shaving of the material around each hole in plate *a* and thus 20 or 30 of these holes can thus be rectified by one punch at one operation. The proper plugs or bushed jewels *e'*, *f'*, *g'*, are then inserted in the respective recesses *e*, *f* and *g* prepared for them, being of diameters to produce a working fit therein. The same operation is carried out with each bridge *a'*, (if more than one bridge is required for the completed watch) using the corresponding rectifying punch shown in Fig. 3. The proper moving parts and foot pins are assembled between each bridge and the plate, the screws or other fastenings driven home and the movement is completed.

As all the holes *e*, *f*, *g* in plate *a* are thus spaced apart exactly with reference to foot holes *h*, *i*, *k* and the same is true of the corresponding holes in bridge *a'*, it is evident that when the feet of the bridge are inserted in the foot holes of the plate the hole *e* in the bridge will be exactly opposite and in line with the corresponding hole *e* in the plate, and so on throughout the group.

The same process may include blanking out holes which are to be subsequently tapped to receive screws used in fastening the bridges to the plate and should include any necessary work holes.

If some of the recesses in the plate *a*, which have to be thus rectified, are so close together that all the corresponding punch pins cannot be set in one matrix *x*, the rectifying of the holes or recesses is done in groups with separate multiple punches, being careful to arrange that all the holes to be punched in any one bridge are thus rectified by punch pins set in one matrix to insure their accurate spacing apart and perfect parallelism.

If additional holes, called "work holes" are needed in plate or bridge they are rectified in the same operation. If a bridge has only one foot hole, a portion of the bridge periphery may be used together with the one foot hole as the basis of rectification, the finishing punch being equipped with a guide cooperating with that portion of the bridge periphery.

The advantages of this invention are so important and numerous as to have practically revolutionized the manufacture of watches in quantity. These may be recapitulated more in detail, as follows:

Perfect precision of shape in all parts of the movement which produces perfect interchangeability of such parts and eliminates the necessity of numbering and segregating the parts of each movement during their progress through the factory, thus simplifying the work of the assembling operator.

The precision of working rendered possible by this invention is such that the limits of variation in size and location of the journal bearings is reduced to one fourth of a hundredth of a millimeter, which is about ten per cent of the tolerance customary in old processes.

The different types of journal bearings, bridges, plates, foot pins and moving parts can be separately manufactured in quantity and delivered to the assembly benches in boxes of several hundred or a thousand each. The assembler then picks out any one part from its box, exercising no more care than does a compositor setting type, and assembles the set of required parts rapidly and easily without having to cut or file or otherwise work over any of them, to produce a perfectly running watch movement.

One standard form of plate can be made and used for all grades of a movement of a given size, the required number of more costly jewels or cheaper plug bearings being inserted in each case, according to the quality and price of the watch to be made therefrom.

The finished plates and bridges can be more easily tested or gauged than in prior processes. All parts of a given class being exact duplicates one of another, the projecting pins of the standard gauge can be easily inserted in the recesses to be gauged, and, as the duplication of results is so perfect, a testing of one out of every series of several hundred plates or bridges is sufficient to make sure that nothing has gone wrong, instead of testing each individual piece, as has heretofore been necessary.

Plates and bridges are finished up separately, that is to say, they do not have to be screwed together and drilled out in assembled relation to ensure proper alignment of the member of each pair of journal bearings for each shaft or pinion, as heretofore, and then taken apart for succeeding operations. In fact the whole of the costly and delicate operations known as "uprighting" and "jewel setting" are dispensed with.

Plates and bridges can be plated before the plug bearings or bushed jewels are inserted. Consequently it is not necessary to scour off any plated film from the working surfaces of journal bearings when the movement is assembled, as has heretofore been necessary.

The variety of lengths of gear shafts or pinions and of other rotatable shafts can be greatly reduced below that heretofore necessary, as the plug journals and bushed jewels can easily be set in their recesses exactly flush with the surface of the plate or bridge, or depressed to exactly the right distance below such surface to allow a shaft of standard length to rotate freely in the opposite bearings so formed. Consequently, with this invention pinion shafts need be prepared in lengths varying over a range of only .02 to .03 mm., whereas heretofore it has been necessary to carry many different lengths in stock, ranging through limits of .10 to .15 mm. in variation.

Any jewel which has been bored out of line with the mathematical axis of its bushing is discovered and discarded in the operation of trimming its circumference to exact concentricity in the machine of Patents Nos. 1,523,169 or 1,528,872, whereas heretofore such a defect was not discovered until the work had reached the assembler and finisher and then caused much annoyance and costly refitting.

The work of the repair man is also immensely simplified. If he finds the bearing in a journal plug is worn, or a jewel cracked, he does not have to rebore the bearing or prepare a new jewel. He can obtain from the manufacturer, or carry in stock, any desired quantity of the standardized plugs and bushed jewels, punch out any defective one which he finds in the watch he is repairing, and slip in a new one.

I claim as my invention:

1. In a manufacturing process for blanks of watch movements provided with holes for settings and bushes the procedure of establishing the interchangeability of each piece by first putting in all the holes according to suitable guide marks and then of rectifying all the holes of each piece simultaneously by means of one and the same punch which is likewise guided by suitable but particular marks.

2. In a manufacturing process for blanks of watch movements provided with holes for settings and bushes the procedure of establishing the interchangeability of the bridges by first putting in all the holes according to at least two holes used as guide marks and then rectifying all the holes of each bridge simultaneously by means of one and the same punch which is likewise guided by guide marks comprising parts of the peripherical surface of the bridge.

3. In a process for making a watch movement, the steps of first treating the plates and bridges to form the necessary gear or wheel recesses, and journal bearing holes of approximate size, then simultaneously rectifying by one punch a plurality of the holes previously thus approximately located, and assembling the parts according to the rectified holes.

4. A process for making and assembling parts of a watch movement which consists in first shaping the parts and roughly making the necessary guide and other holes in the respective parts in the usual manner, then rectifying a plurality of said holes with a single multiple punch having enough punch pins to rectify the desired number of holes at a single operation, then assembling the parts in accordance with the rectified holes.

5. A process for treating blanks for plates and bridges, and assembling pivot-bearing plugs and bushed, perforated jewels therewith into watch movements, which process comprises making in said blanks any desired sinks and other recesses for gear wheels and the like, together with approximately located holes for said bushed jewels and plugs and foot pins for said bridges, thereafter rectifying said foot holes and a plurality of said holes for bushings and plugs at a single operation by a multiple punch having the desired number of punch pins of a slightly larger diameter than said roughly prepared holes, rectifying said plugs and bushings so that their peripheries will be exactly concentric with the pivot-bearing recesses therein and of exactly the diameter of the respective rectified holes in plates and bridges intended to receive them, and then assembling the parts so treated into respective watch movements.

6. The herein described process of preparing plates and bridges for watch movements, which comprises the following steps: Preparing a series of recesses in a plate and bridge in approximately the locations to be occupied by the foot holes of said bridge and by the journal bearing recesses for the moving watch parts to be supported between said bridge and plate, but which recesses are of slightly less diameter than the structural parts to be eventually inserted therein; then simultaneously rectifying all said holes by a standardized multiple punch, the punch pins in which have exactly the correct diameters to be given the holes which they respectively enter and are spaced apart in exact accordance with corresponding dimensions of the perfected movement for use in which said plate and bridge are designed.

Signed at Bern, Switzerland, this 21st day of February, 1927.

HENRI COLOMB.